United States Patent
Riley (10) Patent No.: US 8,700,754 B2
(45) Date of Patent: Apr. 15, 2014

(54) AUTOMATED TOPOLOGY DISCOVERY AND MANAGEMENT FOR ELECTRIC METERS

(75) Inventor: Glen M. Riley, Los Gatos, CA (US)

(73) Assignee: Echelon Corporation, San Jose, CA (US)

( * ) Notice: Subject to any disclaimer, the term of this patent is extended or adjusted under 35 U.S.C. 154(b) by 1724 days.

(21) Appl. No.: 10/969,383

(22) Filed: Oct. 19, 2004

(65) Prior Publication Data

US 2006/0085346 A1 Apr. 20, 2006

(51) Int. Cl.
*G06F 15/173* (2006.01)
(52) U.S. Cl.
USPC .............. 709/223; 709/220; 340/870.02
(58) Field of Classification Search
USPC .................................. 709/223–224
See application file for complete search history.

(56) References Cited

U.S. PATENT DOCUMENTS

| | | | | |
|---|---|---|---|---|
| 6,553,417 B1* | 4/2003 | Gampper | ...... | 709/224 |
| 6,885,309 B1* | 4/2005 | Van Heteren | ...... | 340/870.11 |
| 7,271,735 B2* | 9/2007 | Rogai | ...... | 340/870.02 |
| 2005/0083210 A1* | 4/2005 | Shuey et al. | ...... | 340/870.03 |
| 2007/0013547 A1* | 1/2007 | Boaz | ...... | 340/870.02 |

* cited by examiner

*Primary Examiner* — Abdullahi Salad
(74) *Attorney, Agent, or Firm* — Blakely, Sokoloff, Taylor & Zafman LLP (57) ABSTRACT

A method for automated topology discovery and management of meter nodes in a power grid is described. In the discovery mode any of the meter nodes is able to act as a proxy for a data concentrator to sort out the topology, and to determine the best path for communicating between a concentrator and each of the meter nodes.

5 Claims, 5 Drawing Sheets

1. <N1> -> <N2>:      4B 24 <N1> <N2> <N3> <N4> X 01 <Request>
2. <N2> -> <N3>:      4B 34 <N1> <N2> <N3> <N4> X 01 <Request>
3. <N3> -> <N4>:      4B 44 <N1> <N2> <N3> <N4> X 01 <Request>
4. <N4> -> <N3>:      4A 34 <N1> <N2> <N3> <N4> X 01 <Response> <SSlo>
5. <N3> -> <N2>:      4A 24 <N1> <N2> <N3> <N4> X 01 <Response> <SSlo> <SSli>
6. <N2> -> <N1>:      4A 14 <N1> <N2> <N3> <N4> X 01 <Response> <SSlo> <SSli>

FIG. 3A

1. <N1> -> <N2>:           4B 24 <N1> <N2> <N3> 00 00 00 00 00 00 X 01 20 04 <Request>
2. <N2> -> <N3>:           4B 34 <N1> <N2> <N3> 00 00 00 00 00 00 X 01 20 04 <Request>
3. <N3> -> broadcast:  4B 44 <N1> <N2> <N3> 00 00 00 00 00 00 X 01 20 04 <Request>
4. <N4> -> <N3>:           4A 34 <N1> <N2> <N3> <N4> X 01 <Response> <SSlo>
5. <N3> -> <N2>:           4A 24 <N1> <N2> <N3> <N4> X 01 <Response> <SSlo> <SSli>
6. <N2> -> <N1>:           4A 14 <N1> <N2> <N3> <N4> X 01 <Response> <SSlo> <SSli>

FIG. 3B

Query ID Outbound

<code><Session#><Low ID><Hi ID><Min.ComOutage><Flags>

FIG. 4A

Query ID Inbound

<code><Program ID><Best DC ID><Route Quality>

FIG. 4B

Respond to Query Outbound

<code><Session#><ON/OFF><Route Quality>

AUTOMATED TOPOLOGY DISCOVERY AND MANAGEMENT FOR ELECTRIC METERS

FIELD OF THE INVENTION

The invention relates to the field of electric meters.

PRIOR ART AND RELATED ART

Automated electric meter reading has been considered for many years and is in use in some jurisdictions. In its simplest form, the meter includes a communications device to periodically report the amount of power consumed. In more complex applications, bi-directional communications are maintained with a meter, and for instance, intelligent meters may be used to shed load during periods of high power consumption.

A system for communicating between data concentrators and meters has been developed and is sold by Echelon Corporation of San Jose, Calif. LonTalk®, a communications protocol, allows communications among devices in a network such as communications between meters and a data concentrator. These communications can occur over power lines, twisted pair, radio frequency (RF), infrared (IR), coaxial cable and fiber optics. Each meter includes a Neuron® cell for providing processing of data and other control functions. Each cell is assigned a unique 48-bit identification (ID) number. The general architecture of the cell and the network is described in U.S. Pat. No. 4,918,690.

In general, when a meter is added in a electrical grid, its ID number is provided to a data concentrator, enabling the concentrator to then communicate with the meter. These communications, for the most part, occur in an operating mode where the meter is reporting, for instance, power consumption data to the concentrator and the concentrator is providing control signals to the meter.

As will be seen, the present invention provides a protocol for automated topology discovery and management for electric meters.

Some meter nodes are currently updated by broadcasting the new program twice. This is necessary since it is unknown whether a meter node is executing the current program out of a first bank or a second bank of its memory. The first broadcast of the new program is identified as being loadable into a first bank. If a meter is executing out of that bank, the program is ignored. The second time the new program is broadcast, it is identified as being loadable into a second bank. The meter node will then load the program into the second bank. A command is then sent telling the meter node to switch banks. Similarly, if a meter is executing out of the second bank, it loads the first broadcast of a new program into its first bank, and ignores the second broadcast of the new program. Unfortunately, this method can be time consuming since transmission over a power line is relatively slow, and in some cases, several hops are required before reaching the meter nodes at the end of a line. As will be seen, a method for more efficiently updating the program at the meter nodes is described.

SUMMARY OF THE INVENTION

In one embodiment, a method for discovering the topology of electric meter nodes connected by electrical power lines is described. A data concentrator, or the like, broadcasts over the power lines a first message requesting one or more of the nodes to respond. The concentrator, by examining the responses to the first message, is able to select one or more meter nodes to act as a first proxy. The first proxy then sends a message over the power lines to request one or more other meter nodes to respond. The responses to the second messages allow other nodes to be selected as second proxies. Eventually, a table is created at the concentrator including the meter nodes' ID number, and the list of the intermediate meter nodes' ID numbers, if any, used to reach each of the nodes in the table. Routing of communication is selectable based on criteria such as number of hops and signal strength.

DETAILED DESCRIPTION

A method for automated topology discovery and management for electric meters in their associated nodes is described. In the following description, numerous specific details are set forth such as specific protocol details, timing, etc. in order to provide a thorough understanding of the present invention. It will be apparent to one skilled in the art that the present invention may be practiced without these specific details. In other instances, well-known communications techniques, programming operations, etc. are not described in detail in order not to unnecessarily obscure the present invention.

Meter Node and Data Concentration Environment

Each of the meter nodes 15 and 16 includes an electrical meter or equivalent device for reading and/or controlling power consumption. Also, each meter has associated with it a cell (such as an Echelon Neuron® cell or other processor), a power line transceiver for allowing communications over the power line, and a power line coupler to allow the transceiver to send and receive messages over the power line. These communications are serial bit streams which modulate a higher frequency carrier. The cell, transceiver and coupler are all commercially available.

Figure 1:
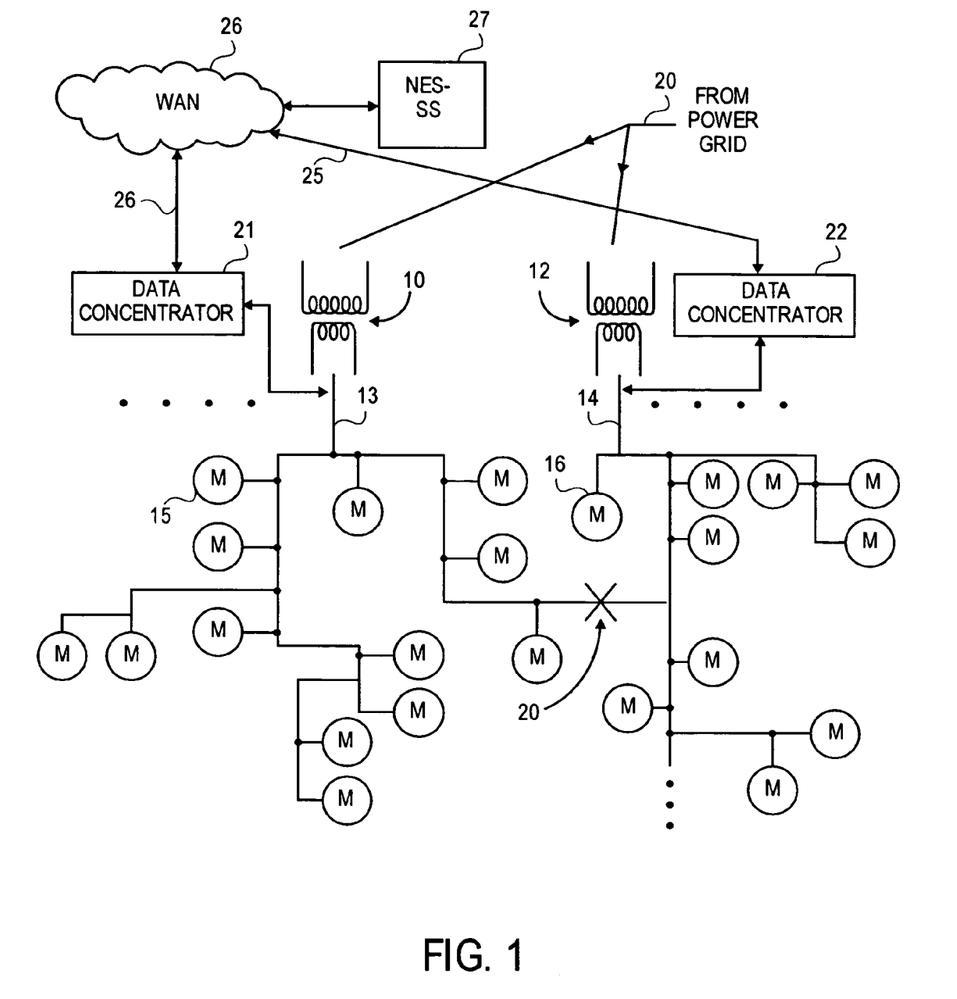
FIG. 1 is a diagram showing the communications between meter nodes, data concentrators and a network energy services, system's server (NES-SS) in a mesh power distribution network.

In FIG. 1, an electrical power distribution network is shown schematically by two transformers 10 and 12, which are connected to a power grid over line 20. Line 20 receives power from transmission lines with the power being stepped down from a higher transmission voltage to a lower voltage before being connected to transformers 10 and 12. These transformers are located at the customer end of the network and are used to transform the power to a voltage used by customers. In the case of transformer 10, this lower potential is distributed over lines 13 to a plurality of consumers, each of which is represented by a meter (M) located at a node, such as meter node 15. Similarly, current from the secondary side of transformer 12 is distributed over lines 14 to a plurality of meter nodes such as meter node 16.

In some cases, meter nodes are, in effect, fed from more than a single transformer where, for instance, the distribution network is connected in a mesh arrangement. A connection at 20 of FIG. 1, when present, may cause, for instance, power from transformer 12 to be consumed through meters ostensibly connected to line 13. As will be discussed below, the mesh configuration presents unique problems to automatically defining a topology.

Each meter node communicates with at least one data concentrator. There is a data concentrator located at or near each of the transformers. For instance, transformer 10 has a data concentrator 21, and transformer 12 has a data concentrator 22. The concentrators for the most part control the protocol described below and communicate with meter nodes. These communications occur over the power line, and consequently, each data concentrator includes a power line transceiver and a power line coupler for communicating a serial bit stream with the meter nodes. Moreover, each of the data concentrators includes a wide area network (WAN) port for coupling the concentrator to WAN 26. The NES-SS 27 is also connected to the WAN 26 to allow bi-directional communications with the data concentrators. The communications over the lines 25 and 26, and the NES-SS 27 may be, by way of example, Internet connections, or communications over a public switched telephone network (PSTN).

In one embodiment, each of the concentrators includes a processor such as a Pentium® processor from Intel Corporation, a 8 MBs flash memory and a 8 MBs of RAM. Additionally, the concentrator includes a serial port for communicating with a power line and a WAN port for communicating with the NES-SS. Each concentrator also includes a cell, such as a Neuron® cell from Echelon Corporation.

Two principal modes of operation occur in the communications between the meter nodes, data concentrators and the NES-SS 27. As described below, during the discovery mode, the topology of the meter nodes, with respect to each of the data concentrators, is effectively determined. Once this determination is made and the meters commissioned, the communications involve operating mode reporting and control of electrical distribution. As will be also discussed, even during the operation mode, periodically the data concentrators seek out meter nodes that may have become disassociated from a data concentrator by, for instance, fuse changes or some other alteration to the power distribution network.

As used below, the term "commissioning" of a meter refers to a communication network commissioning not a power distribution commissioning. The commissioning of a node consists of the assignment of a logical address using a security key.

Each of the Neuron® cells, as mentioned earlier, includes a unique 48-bit ID number. Thus, each meter node and each data concentrator has a unique 48-bit ID number which is used as an address and identifier for each meter node and data concentrator. During the discovery mode, each meter node may operate as a proxy in the domain of the concentrator, or in fact, may operate as a proxy in the domain of another concentrator. Moreover, nodes function as proxies whether or not they are commissioned.

Overview of Discovery Method

The protocol described below during discovery mode, allows the concentrator to broadcast directly, or via proxies, to nodes and to ask the nodes to respond based on certain criteria. Depending on whether the concentrator is trying to discover all meter nodes or only those that are out of communications, it sets the criteria in an appropriate manner. While attempting to locate nodes that are out of communications, the focus is on finding groups of nodes that were relocated due to switch or fuse changes. Thus, it is assumed to be sufficient to attempt to discover a subset of nodes in one domain via a subset of nodes in another domain. Each subset is the set of test points in the domain. (Details on the test points, and how they are established, will be described below.) Generally, the test points are those that are closest to the boundary of the network, and thus, are best suited for detecting changes at the boundary.

In the discovery mode, each of the meter nodes is detected and a table is created based on the node's ID number. The table includes, in one embodiment, the program version residing at the node and proxy ID numbers of those meter nodes acting as repeaters. Additionally, data indicating whether the meter is commissioned or not, and a recommendation as to whether to commission the meter on this concentrator, and like data discussed below is included. The NES-SS can then identify which meter nodes are to be commissioned.

All discussed meter nodes are added to the table during the discovery mode. The discovery protocol defines a global discovery domain using a predetermined code. All messages sent by the concentrators are sent unacknowledged with the concentrator handling all retries and timeouts. As mentioned, both commissioned meters and un-commissioned meters reside in the domain. In general, the messages in the discovery domain are application level messages which can be implemented in a processor such as the processor included within the Neuron® cell.

Figure 2:
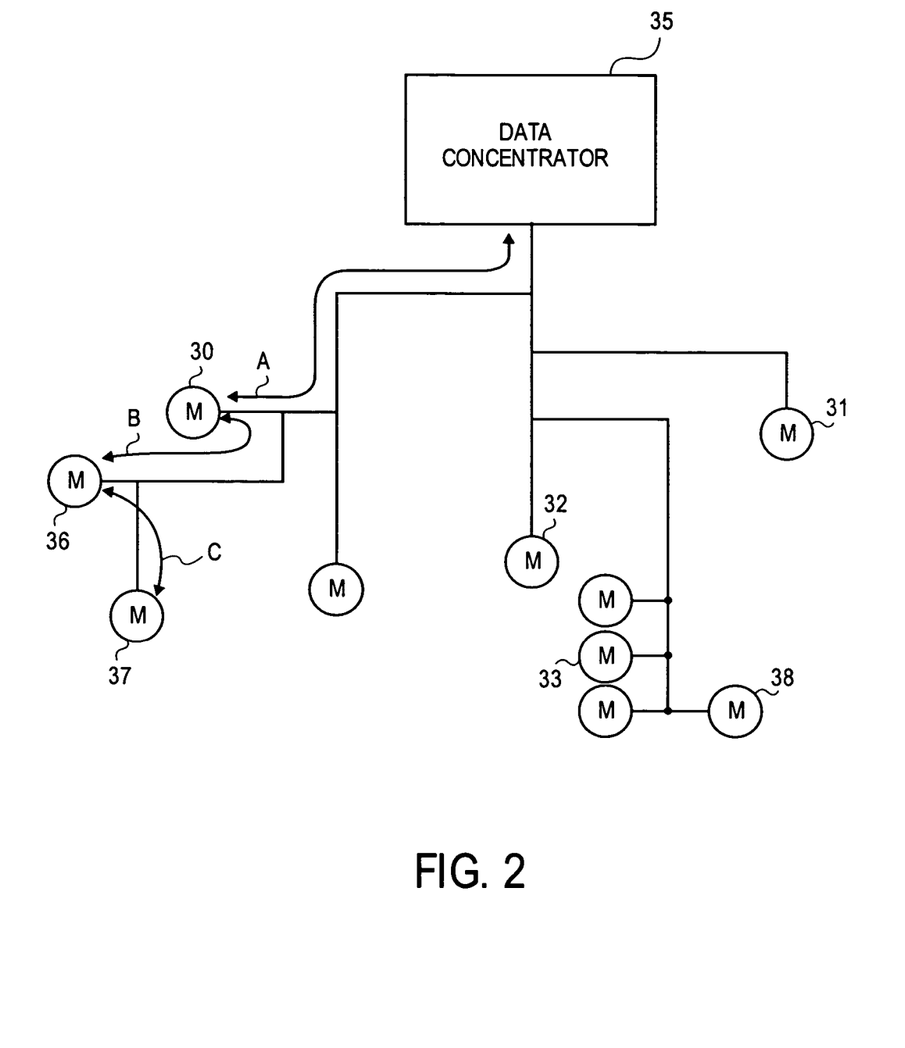
FIG. 2 is a diagram illustrating a single concentrator and associated meter nodes. This diagram is used to describe the operation of the discovery protocol.

In FIG. 2, a data concentrator 35 is illustrated along with a plurality of meter nodes. Assume first that the concentrator 35 has just been installed, and furthermore, that none of the meter nodes are commissioned. The concentrator 35 may begin by sending out a broadcast message asking meters receiving the message to respond. To limit the number of responses, the message identifies certain groups of meters by sending a message identifying a range of meter node ID numbers.

In one embodiment described below, a hash of ID numbers is used. In a first range of ID numbers, a meter 30 may respond as indicated by the communications link A. Another meter, for instance, meter 33 which may fall within the same range, may not respond since, because of its location in the distribution network, it does not receive the message. In other ranges of ID numbers, meters such as 31 and 32 may respond but none others, since the others are located too remotely from the concentrator, for the example at hand. The concentrator seeks then to enlist, for instance meter 30, as its proxy to send messages out seeking other meters that can be reached from meter 30. By way of example, meter 36 may be discovered by the link B. A message is sent back to the concentrator 35 indicating that meter 36 was reached through a route that included the meter 30. Meter 36 then can be made a proxy and other meters such as meter 37, can be reached.

In this process of discovering meter nodes, the inbound messages returned to the concentrator includes an indication of the quality of the route. A signal strength indicator is returned to indicate the signal strength of the signal between the last proxy and its target. Below, $SSI_0$ designates the outbound signal strength and $SSI_1$ the inbound signal strength. The concentrator knows the number of repeaters used to reach a particular meter node, as well as the signal strength. From this, the route quality is assessed. In one embodiment, the route with the least number of hops is used, and where the number of hops are equal, the route with the greatest signal strength is selected.

In the process described above, the concentrator may request certain meter nodes not to respond to help facilitate the determination of alternate routes. Other messages are used, for instance, periodically as mentioned during the operating mode, when the concentrator seeks out meter nodes out of communication. Here, only meter nodes that are out of communication with the concentrator for some predetermined period respond.

The signals are physically sent by modulating a carrier signal. There is a primary carrier frequency and a secondary carrier frequency. The route quality may be evaluated using both frequencies. There is a frequency mask field in some messages as will be discussed later, to facilitate the selection of alternate routes.

As mentioned earlier, certain meter nodes located on the boundary of the discovery domain, that is those that are most attenuated, may be designated as test points by the concentrator. For instance in FIG. 2, meter nodes 37 and 38 may be designated as test points. The test points are particularly useful for re-association when, for instance, a switch or fuse change occurs in the power distribution network.

Proxy Message

All addressing is based on the ID number discussed above. The discovery protocol includes a header that enables all the meter nodes to participate in the discovery process, and to act as proxies, even if such nodes are not commissioned. Each message contains a repeat chain of ID numbers in a route, and the entire repeat chain is passed from proxy-to-proxy in the outbound message and in the inbound message. For this reason, it is unnecessary for each of the proxies to keep track of the messages it repeats.

Figure 3A:
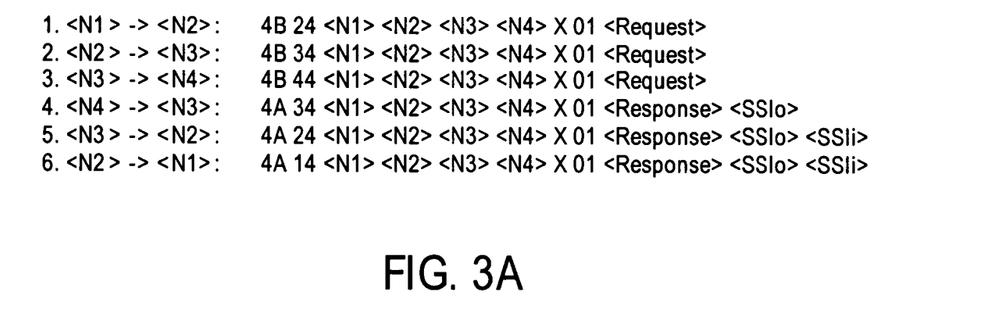
FIG. 3A shows several proxy messages used in one embodiment of the discovery protocol.

Referring to FIG. 3A and the first message (1) shown, this messages is being sent from ID number N1 to ID number N2. N1 is the ID number of a concentrator and N2 is the ID number for a meter node. The message preamble begins with "4B" (hex value) which indicates that the message is an outbound message. (All numbers in message fields are in hexadecimal format.) "4A" shown for messages 4, 5 and 6 of FIG. 3A indicate an inbound message. The next two numbers, 2 and 4, are sometimes below referred to M and N, respectively. The 2 indicates, by way of example, that N2 (receiving address) is the second address in the sequence, N1, N2, N3 and N4. The 4 indicates that there are 4 addresses total in the address field (including the concentrator). From these numbers, forwarding rule can be established. For instance, if M>N, the message is illegal and the message is discarded. If M=N (outbound) or if M=1 (inbound), then the message is for this device and the message data following the proxy header is processed as an ordinary message. If M<N then M is incremented (outbound) or decremented (inbound).

Again, referring to FIG. 3A, a message is sent from the concentrator with a number N1 to a first meter node N2, which repeats the message and sends it on to a meter node N3, N3 repeats the message for N4. The message itself is simply shown as "request." As can be seen, all four ID numbers appear in each of the messages. Messages 1, 2 and 3 are outbound messages and these have the code 4B. As the message is sent out, the first digit in the number following 4B is incremented up to the value "4" with each hop. Then this number is decremented as the inbound message is sent.

The signal strength of the signal as received by node N4 is indicated as $SSI_1$ on the return message, and the signal strength as received on the inbound message at node N3 is indicated by value $SSI_1$. In general, when receiving the last outbound message or the first inbound message (M=N−1) the meter node will read the signal strength indicator (SSI) corresponding to that message and append it to the message.

The X following the address list designates a frequency mask which uses one bit per hop, where for example, the value of one indicates use of the secondary carrier frequency. The mask will have $$\frac{N-2}{8} + 1$$

bytes.

The "01" in FIG. 3A before the request and response of each message represents the transaction number, this is a one-byte field in one embodiment. The transaction number may be any number from 0 to 255. The transaction number in the inbound message must match that of the outbound message.

Figure 3B:
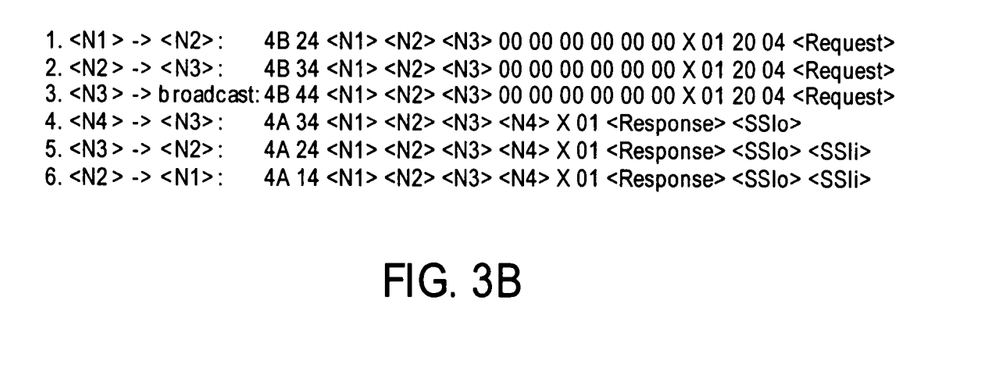
FIG. 3B shows several proxy broadcast messages used in one embodiment of the discovery protocol.

For a broadcast message, six bytes of 0s are transmitted to indicate broadcast. The responding meter node writes its ID number into the address portion of the as shown in FIG. 3B. Again in FIG. 3B, a path mask and transaction field are shown. In FIG. 3B, the last two fields (20 and 04) indicate packet cycle width and packet cycle count for outbound broadcast. The packet cycle count is limited to the range of 0 to 127 in one embodiment. If the last bit is set, the lower 7 bits indicate a specific slot to choose in the test mode.

In general, even though CSMA is used for collision avoidance, it cannot be relied on because of the nature of the network. Therefore, the responses to a broadcast must be randomized over several packet cycles. This is controlled by the packet cycle width and packet cycle count fields. It is the responsibility of the meter nodes sending the broadcast to wait for the worst-case response time to lapse. In this way, responses do not collide or contend with inbound messages. A proxy will forward only the first response it gets.

When responding to a broadcast, a meter node is able to submit a response which, in effect, states "send this if it can be sent in the next packet cycle, otherwise drop it." This is necessary to ensure that the product is not transmitted during other packet cycles. Furthermore, the proxy will forward only the first response it sees to the broadcast and then only after all the broadcast response cycles have passed.

Query ID Message and Response

The query ID messages are always sent using the proxy protocol discussed above. These messages ask a meter node (or another concentrator) to respond if certain criteria is met. The criteria used, in one embodiment, are as follows:

1) Respond if the ID number falls within a predetermined range. As mentioned earlier, each meter node includes a cell having a 48-bit ID number. For purposes of this criterion, a hash of the 48-bit number is used. For example, the 6 bytes of the ID number are summed to provide an 8-bit number. This hashed number is used to limit the number of devices that respond to a request. Typically, a query ID number is done over a small range of this 8 bit hashed number. If this does not result in too many responses, then the initiator marches slowly through the entire range. If on the other hand, the initially selected range results in no responses or too small a number of responses, then the next query may contain a larger range. If too many responses occur, the range is decreased. Thus, the range can be adjusted either upward or downward.

2) Any of the meter nodes can be disabled from sending responses for a particular query session by request from the initiator for this option. There is a "respond to query/off" message which may be sent for any data concentrator session. The meter nodes are capable of storing several such messages, each of which is associated with a concentrator. For each session, the node keeps a flag indicating whether to respond to additional queries, and it will also store route quality data. If a node should lose the "respond to query/off" command and respond again to a subsequent query, the concentrator is capable of detecting this case and backing off, randomizing, and trying the query again.

3) A message may request that only meter nodes that are out of communications respond to a particular query option. A node that has not received an application level message from a concentrator in a specified period (e.g. 30 minutes) may assume that it is out of communications.

4) For the test point option discussed above, a message may be designated as requiring a response from only test points. The response identifies the concentrator with the best route quality.

Each of the meter nodes, upon receiving a query ID message, is able to determine whether it is to respond or not respond from the message for a given session.

Figure 4A:
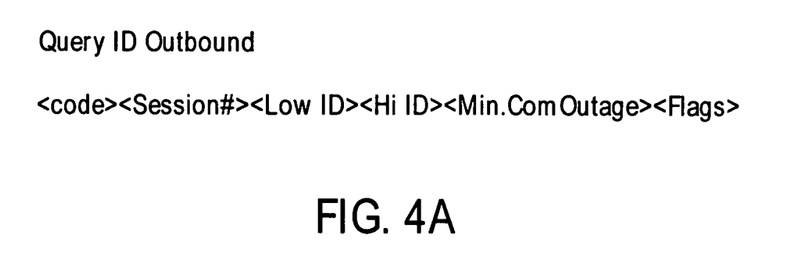
FIG. 4A illustrates the content of an outbound query ID message for one embodiment of the discovery protocol.

FIG. 4A shows an embodiment of an outbound query ID message. The first field is a code used to identify the message type, for instance, "49." The next field, which may be one byte, is the session number. The "Low ID" field is the one byte hashed lower range of the ID numbers. The next field "High ID" is the upper end of the range of the hashed ID number. The next field is a two-byte field which indicates the minimum minutes acceptable for no communications before an out of communication flag is set. The last field, which may be one byte, covers the flags for the query ID enable option, out of communication option, and the test point option.

Figure 4B:
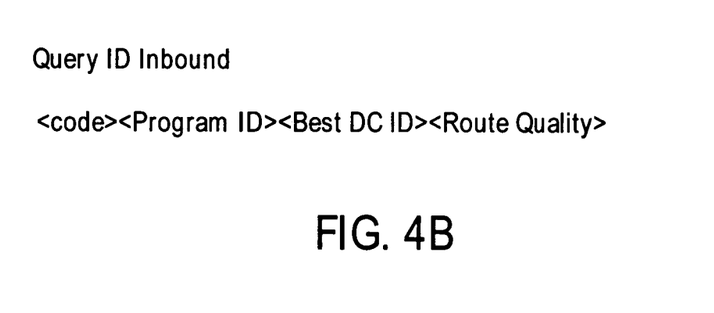
FIG. 4B illustrates the content of an inbound query ID message for one embodiment of the discovery protocol.

A message format for the inbound query ID is shown in FIG. 4B. The first field is a message code, for instance, "48." The program ID field may be, for example, 8 bytes to indicate the program version in the meter node. As will be discussed in conjunction with FIGS. 5A and 5B, this program may be updated over the power line. The next field, which is a six-byte field, contains the ID number of the best data concentrator from the standpoint of route quality. The last field, "Route Quality," is a two-byte field indicating first the number of hops, and secondly, the signal strength.

Figure 4C:
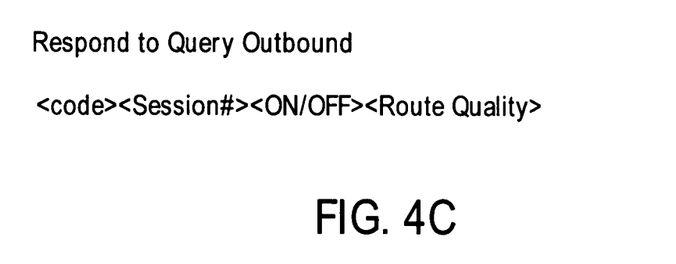
FIG. 4C illustrates the content of an outbound respond to query message for one embodiment of the discovery protocol.

In FIG. 4C is the response to query message format for an outbound message. The field following the code is a session number; this may be a one-byte field. The "on/off" field indicates whether the on or off response flag is set. The last field is the route quality. The inbound message may be simply a code.

The timing of sending the response maybe controlled by the cycle width field and the cycle count field previously discussed. Assume that for a packet, the cycle width is 20 hexadecimal or 32 decimal value, and the cycle count is 4. This is in tens of milliseconds, or 320 milliseconds. For this case, the node generates a random number in the range of 0-3 and multiplies that number by 320. The result is the time to wait in milliseconds before sending the response. Note this time may be zero.

Discovery Protocol Issues in a Mesh Architecture

As shown in FIG. 1, in a mesh architecture, it is possible that two data concentrators will discover the same meter node. Ideally the meter node should be assigned to the concentrator with the best connectivity. Each concentrator refines its list of discovered meter nodes by flagging those nodes that have superior route quality when communicating with that particular concentrator. This typically occurs as a result of conducting the discovery processes multiple times and in parallel with other concentrators. If in the discovery process one concentrator ends up owning a disproportionate number of meters, an NES-SS 27 can require redistribution of the nodes among the concentrators.

In the embodiments as discussed above, particularly in a mesh environment, it is the meter nodes that determine the concentrator with which it has the best route quality. In another embodiment, there can be communications between the concentrators and the best route may then be decided in a discourse between concentrators. Also, items such as time slot usage can be resolved in concentrator-to-concentrator communications where such communications are used.

Bandwidth Allocation

In a non-mesh environment, a concentrator is able to use the entire communications bandwidth to discover the meter nodes connected to its respective transformer. However, this is not the case in a mesh network since it is not possible for multiple concentrators to be conducting transactions at the same time.

In one embodiment, the concentrators are able to divide up bandwidth by operating at different periodic time slots in a mesh environment. For instance, an hour is divided into twelve 5-minute slots. A concentrator will hunt for viable transmission slots. If a concentrator encounters communications problems in one communications slot, it will avoid using that transmissions slot. No concentrator, however, will reduce its slots below one.

A concentrator may determine that it is in a mesh environment by discovering meter nodes that have been previously discovered by another concentrator by receiving a message from the other concentrator. It is also possible that a concentrator discovers another concentrator. This, of course, also indicates a mesh network environment. To facilitate this latter case, each concentrator participates as a target "meter node" in the discovery protocol as long as the source ID number in a message is not its own.

It is also possible that a concentrator in a mesh environment will later be in a non-mesh environment because of a power distribution change. The data concentrators periodically re-determine if they are in a mesh environment in order to undo the previous decision to operate in a mesh environment.

In one embodiment, the concentrator initially defaults to no known valid time slots. When first engaging in discovery, it randomly selects slots, for example, three slots. It then begins to discover meter nodes until no new nodes are found. Then, it will proceed using three different slots. It will continue to do this until, for instance, two consecutive tries occur without finding any new meter nodes.

In the normal operating mode, the concentrator may limit itself to three slots initially. It can then back off if problems occur in communicating with the meter nodes. If the pending backlog of activities that need to be completed by the concentrator becomes unreasonably large, the concentrator may begin to select more slots for use.

Updating Software in the Meter Nodes

Figure 5A:
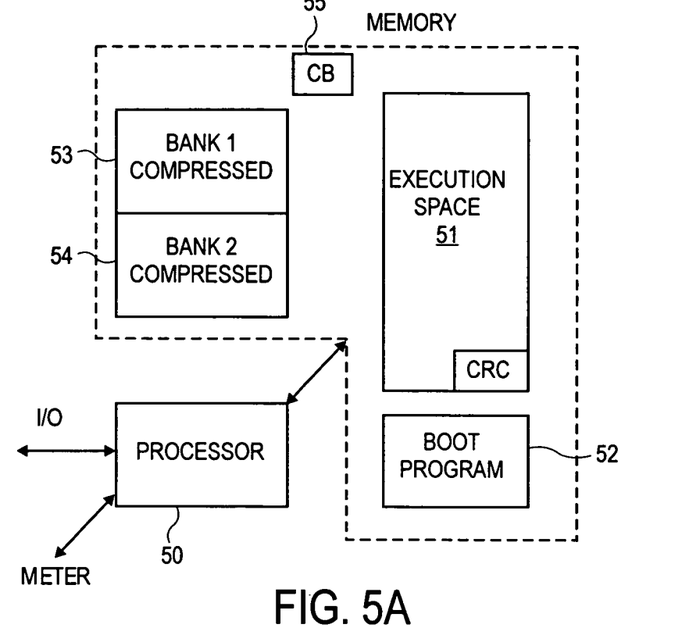
FIG. 5A is a diagram of a meter node particularly showing its memory.

In FIG. 5A, a meter node is illustrated with a processor 50 which, as mentioned above, may be a Neuron® cell from Echelon Corporation. There is a serial I/O line for communicating with the power line and a bus for coupling the processor with a meter and other power related devices. The memory is shown having a boot program 52, an execution space 51 and a first bank 53 and second bank 52. There is also a control bit 55. The entire memory is, for instance, a flash memory.

Figure 5B:
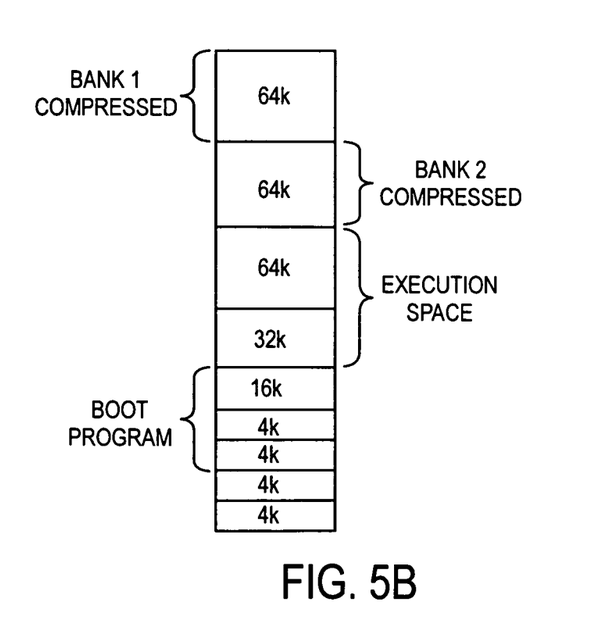
FIG. 5B is a diagram showing the memory space organization of the memory of FIG. 5A.

The organization of the memory is shown in FIG. 5B. The first 64K of the memory is bank 1, bank 2 is next 64K, the execution space uses a 64K and a 32K space in the memory.

There is a 16K and two 24K blocks used for the boot program 52. Lastly, there is 8K reserved for other storage such as ID number and the control bit 55.

When shipped, a program is loaded in compressed form into both banks 1 and 2, and the same program is loaded in uncompressed form in the execution space 51. A CRC for the program is loaded also into the execution space to allow verification that the program has been properly loaded. As shipped, the control bit is set in either of its two states.

The boot program 52 includes codes for decompressing the program and loading it into the execution space 51. Moreover, the boot program includes a routine for verifying that the program in the execution space has the proper CRC.

When a new program is broadcast to the meter nodes, the processor checks the state of the control bit 55 and based on that state, it loads the program into the bank to which the pointer is not pointing. The program is accepted in compressed form by the processor and loaded into one of the two banks. After the program has been loaded into one of the two banks, the processor switches the control bit 55 on command from, for instance, its concentrator. This causes the boot program 52 to be executed, thereby decompressing the new program from its bank and placing it into the execution space 51. The new program includes a new CRC. If the new CRC cannot be verified, or if a watchdog timer runs out because the decompression did not occur, or other problems occurred, the decompression is tried again. If it fails a second time, the boot program then decompresses the prior program from its other banks and places it in the execution space. In doing this, it changes the state of the control bit 55.

This technique has the advantage over the prior art in that the new program needs to be transmitted only once. Moreover, the program is transmitted in compressed form, further reducing the transmission time. If the download of the new program is unsuccessful, the prior program is reinstalled and used.

Thus, a method for discovering the topology of meter nodes and for maintaining communications with the meter nodes has been described.

What is claimed is:

1. A method for discovering the topology of electric meter nodes connected by electrical power lines comprising:
   broadcasting over the power lines a first message requesting one or more of the meter nodes to respond, wherein the first message identifies the one or more meter notes to respond by a range of meter node ID numbers;
   examining one or more responses to the first message and selecting from the responses one or more of the meter nodes to act as first proxies;
   sending second messages from the one or more first proxies over the power lines requesting one or more meter nodes to respond;
   examining one or more responses from the second messages and selecting from the responses one or more meter nodes to act as second proxies wherein the response to the second message includes a measure of first signal strength of the second messages received at the nodes responding to the second message, and wherein the selecting takes into account the first signal strength and a second signal strength of the response from the second message; and
   creating a table of meter nodes including which proxies, if any, are used to reach each meter node.

2. The method of claim 1 wherein the selecting of one or more meter nodes to act as one of the proxies includes a consideration of the number of hops needed to reach the meter node.

3. A method for determining the topology of electric meters which communications over power lines, comprising:
   sending a first outbound message having a first field identifying a first range of meter identification (ID) numbers to be included in the topology of meters, wherein the meter ID numbers are hashed;
   receiving a first inbound message from one of the meter nodes identified by the first range, the first inbound message having an indication of route quality including first signal strength (SSI1) of a received first outbound message;
   sending a second outbound message having a second field identifying a second range of meter ID numbers;
   receiving a second inbound message from one of the meter nodes identified by the second range, the second inbound message having an indication of the route quality including second signal strength (SSIo) of a received second outbound message;
   selecting from the first and second inbound messages a meter node to act as a proxy for sending messages to other meter nodes to determine the route quality to the other meter nodes wherein the selecting considers the first and second SSIos and third signal strengths of the inbound messages;
   determining from inbound messages and the route quality information which meter nodes are directly addressable and which require addressing by hopping through intermediate meter nodes; and
   preparing a list of meter nodes identified by their ID numbers which includes an addressing route for each meter node.

4. The method of claim 3, wherein the route quality is based, in part, on the number of hops a message takes to reach a particular meter node.

5. The method of claim 3, wherein each meter has a 48-bit ID number and the hash is a summation of 6 bytes of the ID number to provide an 8-bit number.

* * * * *